US006324400B1

United States Patent
Shah et al.

(10) Patent No.: US 6,324,400 B1
(45) Date of Patent: Nov. 27, 2001

(54) INTELLIGENT ROAMING MOBILE STATION FOR EMULATING A PRE-INTELLIGENT ROAMING MOBILE STATION

(75) Inventors: Amish Shah; Nadi Findikli; David Hoover, all of Cary; Scott Hicks, Apex, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/153,962

(22) Filed: Sep. 16, 1998

(51) Int. Cl.[7] ................................................. H04Q 7/20
(52) U.S. Cl. ..................... 455/434; 455/515; 455/426; 455/450
(58) Field of Search .................... 455/432, 434, 455/515, 450, 426, 435, 419, 461, 552, 455

(56) References Cited

U.S. PATENT DOCUMENTS

| 5,613,204 | * | 3/1997 | Haberman et al. | 455/33.2 |
|---|---|---|---|---|
| 5,790,952 | | 8/1998 | Seazholtz et al. | 455/432 |
| 5,832,367 | * | 11/1998 | Bamburak et al. | 455/62 |
| 5,950,130 | * | 9/1999 | Coursey | 455/432 |
| 5,983,115 | * | 11/1999 | Mizikovsky | 455/512 |
| 6,148,197 | * | 11/2000 | Bridges et al. | 455/432 |

FOREIGN PATENT DOCUMENTS

WO 98/42152   9/1998  (WO) .

OTHER PUBLICATIONS

"Intelligent Roaming Requirements for PCS Phones", *AT&T Wireless Services, Inc.*, Appendix M, Rev. 2.3, Nov. 1, 1996, pp. M–1—M–44.
International Search Report for PCT/US99/21096 dated Jan. 14, 2000.

* cited by examiner

Primary Examiner—Thanh Cong Le
Assistant Examiner—Lana Le
(74) Attorney, Agent, or Firm—Jenkens & Gilchrist, P.C.

(57) ABSTRACT

A method and intelligent roaming mobile station for emulating a pre-intelligent roaming scanning routine used by a pre-intelligent roaming mobile station. The method includes the steps of selecting a search scheme from a plurality of search scheme, and restricting an intelligent roaming scanning routine to scan only the service bands within an 800 MHZ spectrum. In response to the selected search scheme, the intelligent roaming mobile station then prioritizes at least one service band operating in the 800 MHZ spectrum into a band scan order. Thereafter, the intelligent roaming mobile station scans for a channel according to the prioritized band scan order, where the channel connects a service provider to the intelligent roaming mobile station according to the selected search scheme.

29 Claims, 5 Drawing Sheets

INTELLIGENT ROAMING MOBILE STATION FOR EMULATING A PRE-INTELLIGENT ROAMING MOBILE STATION

BACKGROUND OF THE INVENTION

1. Technical Field of the Invention

The present invention generally relates to the telecommunications field and, in particular, to an intelligent roaming mobile station and method for emulating a pre-intelligent scanning routine used by a pre-intelligent roaming mobile station.

2. Description of Related Art

A portion of the service providers that currently provide cellular telephone services to subscribers operate cellular telecommunications networks based on the Personal Communication Services (PCS) standard and, more specifically, the IS-136 standard. Each PCS telecommunications network is assigned a service band having a particular frequency range for use by the subscribers. The PCS standard provides for two service bands (e.g., "a" and "b" service bands) in the 800 MHZ spectrum, and six service bands (e.g., "A", "B", "C", "D", "E" and "F" service bands) in the 1900 MHZ spectrum.

The subscriber receiving cellular telephone service from one of the PCS telecommunications networks generally uses a mobile station having an intelligent roaming database (IRDB) and an intelligent roaming scanning routine (IR scanning routine). These mobile stations are referred to as IR mobile stations. The IR scanning routine of the IR mobile station is activated whenever the subscriber is "roaming" and operates in a manner to locate the one service provider that offers the best service. Of course, the one service provider that offers the best service is generally the one which also provides the least expensive services.

Prior to the implementation of the PCS standard and the availability of the IR mobile station, service providers were assigned one of the two service bands in the 800 MHZ spectrum on which to provide cellular telephone services. These service providers are referred to as 800 MHZ service providers. During this period, the subscribers used pre-intelligent roaming mobile stations (pre-IR mobile stations). The pre-IR mobile station includes a legacy database and a pre-intelligent roaming scanning routine (pre-IR scanning routine) for locating a particular 800 MHZ service provider whenever the subscriber is roaming.

Today several of the 800 MHZ service providers are still in the business of providing cellular telephone services to subscribers that use pre-IR mobile stations in addition to the newer IR mobile stations. Some of these 800 MHZ service providers want to maintain the look and feel of a traditional menu associated with the pre-IR mobile stations within the newer IR mobile stations. The traditional menu enables roaming subscribers to select 800 MHZ service providers.

To accommodate the 800 MHZ service providers that desire to maintain the traditional menu, IR mobile stations can be manufactured to include not only the legacy data base and pre-IR scanning routine associated with pre-IR mobile stations but also the IRDB and IR scanning routine. Using the retrofitted IR mobile station, the subscriber is then able to select either the pre-IR scanning routine using the traditional menu or the IR scanning routine using another menu. Unfortunately, these retrofitted IR mobile stations include two different databases and two different scanning routines to satisfy the small portion of 800 MHZ service providers that want to maintain the traditional menu. Of course, the maintenance of two scanning routines is unsatisfactory for obvious reasons.

Accordingly, there is a need for a method and intelligent roaming mobile station that emulates a pre-intelligent roaming mobile station's scanning routine while continuing to offer the menu used by the pre-intelligent roaming mobile station. There is also a requirement to provide an intelligent roaming mobile station that does not require the maintenance and support of two separate scanning routines. These and other needs are addressed by the intelligent roaming mobile station and method of the present invention.

SUMMARY OF THE INVENTION

The present invention is a method and intelligent roaming mobile station for emulating a pre-intelligent scanning routine used by a pre-intelligent roaming mobile station. The method includes the steps of selecting a search scheme from a plurality of search schemes, and restricting an intelligent roaming scanning routine to scan only the service bands within the 800 MHZ spectrum. In response to the selected search scheme provider, the intelligent roaming mobile station then prioritizes at least one service band operating in the 800 MHZ spectrum into a band scan order. Thereafter, the intelligent roaming mobile station scans for a channel according to the prioritized band scan order, where the channel connects a service provider to the intelligent roaming mobile station according to the selected search scheme.

In accordance with the present invention an intelligent roaming mobile station and method are provided that emulate a pre-intelligent roaming scanning routine used by a pre-intelligent roaming mobile station.

Further in accordance with the present invention there is provided an intelligent roaming mobile station that continues to offer a traditional menu used by pre-intelligent mobile stations while no longer requiring the use of a pre-intelligent scanning routine.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
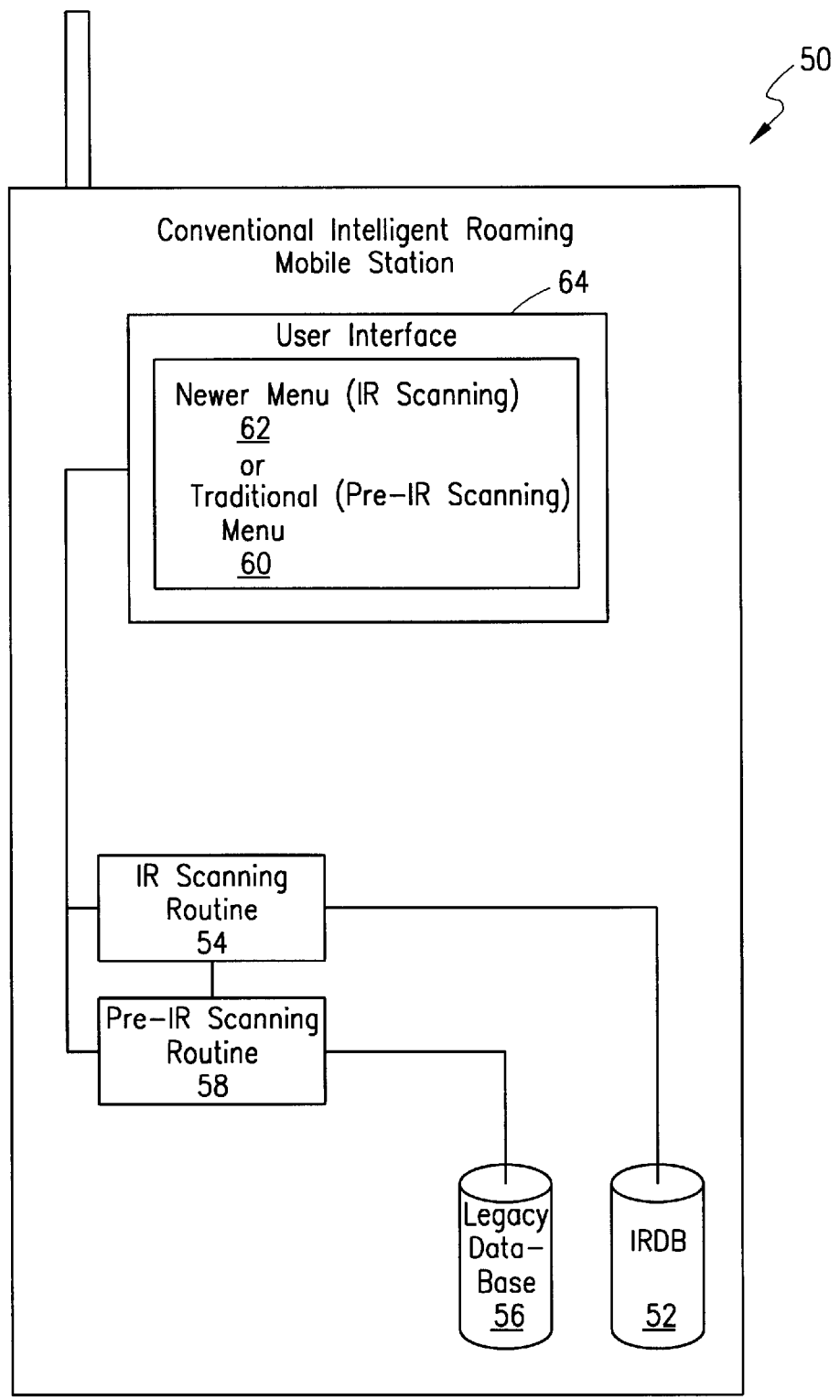
FIG. 1 is a block diagram of a conventional intelligent roaming mobile station having two scanning routines.

Referring to the Drawings, wherein like numerals represent like parts throughout FIGS. 1–5, there is disclosed an exemplary intelligent roaming mobile station (IR mobile station) 100 and exemplary emulating method 200 in accordance with the present invention.

Although the IR mobile station 100 is generally incorporated within a Digital Advanced Mobile Phone System (DAMPS), those skilled in the art will appreciate that such a system is only one of many capable of utilizing the principles of the present invention. Accordingly, the IR mobile station 100 described should not be construed in a limited manner.

First, a brief review of the conventional IR mobile station 50 that was retrofitted is provided in order to better describe the preferred embodiment of the IR mobile station 100. As discussed earlier and with reference to FIG. 1 where only the main elements are illustrated, the conventional IR mobile station 50 includes an intelligent roaming database (IRDB) 52 and an intelligent roaming scanning routine (IR scanning routine) 54 for locating the best available service provider that operates in either the 800 MHZ spectrum or the 1900 MHZ spectrum. In addition, the conventional IR mobile station 50 includes a legacy database 56 and pre-intelligent scanning routine (pre-IR scanning routine) 58 for locating the best service provider operating in the 800 MHZ spectrum.

The legacy database 56 and pre-IR scanning routine 58 were included in the conventional IR mobile station 50, because some of the 800 MHZ service providers wanted to offer a traditional menu 60 (instead of the newer menu 62) used by subscribers to acquire a particular service provider. Either the traditional menu 60 or the newer menu 62 can be displayed on a user interface 64. However, the maintenance associated with supporting two distinct and independent scanning routines (e.g., pre-IR scanning routing and IR scanning routine) is problematic.

Figure 2:
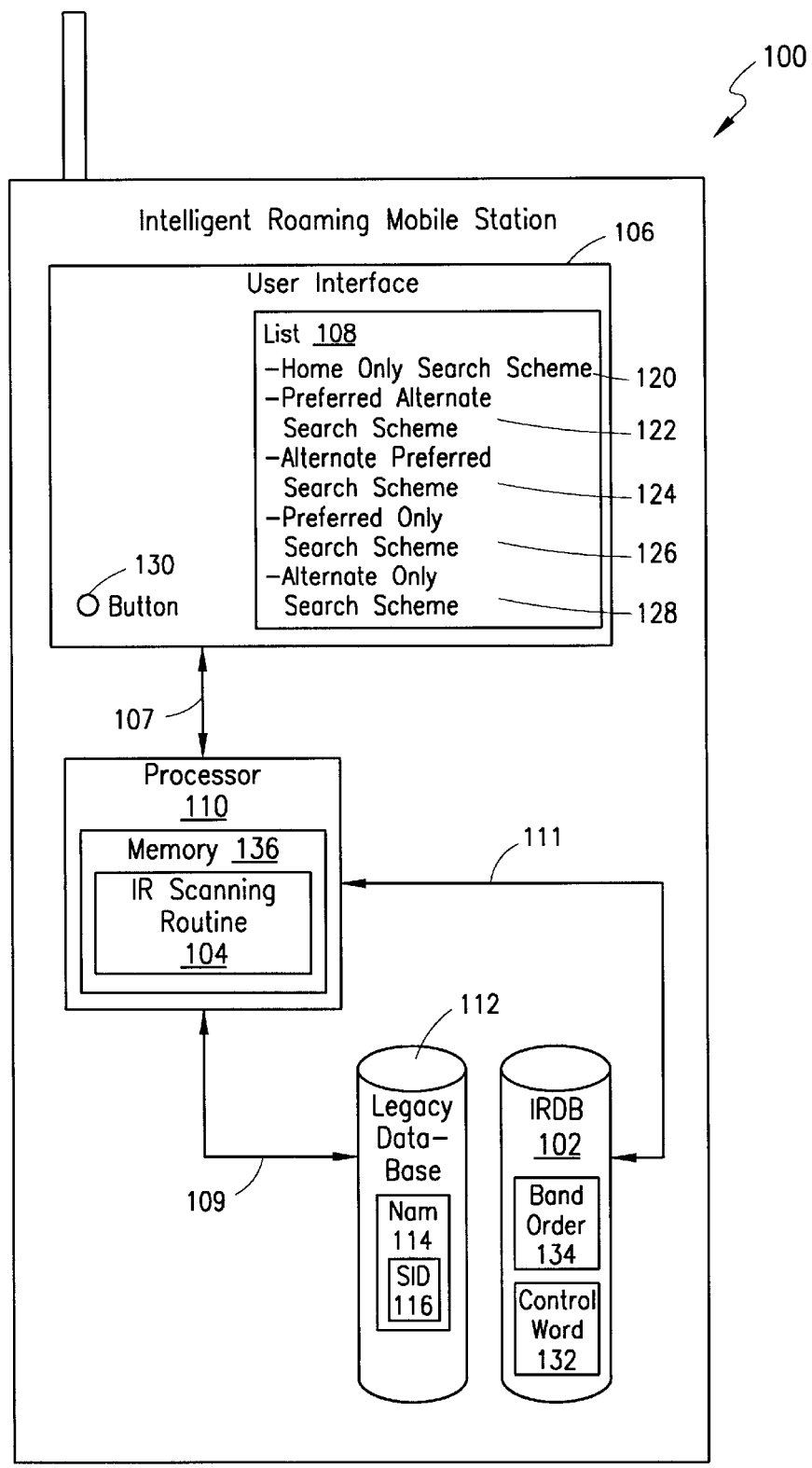
FIG. 2 is a block diagram of an intelligent roaming mobile station of the present invention.

Referring now to FIG. 2, the exemplary IR mobile station 100 of the present invention includes an intelligent roaming database (IRDB) 102 that is modified in a manner such that only an IR scanning routine 104 need be used to locate service providers, while satisfying the 800 MHZ service provider's desire to maintain the traditional menu used by pre-intelligent roaming mobile stations. More specifically, the pre-IR scanning routine is no longer required in the IR mobile station 100 of the present invention.

The IR mobile station 100 includes a user interface 106 used by the subscriber to operate the IR mobile station and to select whether or not to emulate the pre-intelligent scanning routine for locating 800 MHZ service providers. Each 800 MHZ service provider uses either an "a" service band or a "b" service band in the 800 MHZ spectrum.

If the subscriber wants to emulate the pre-IR scanning routine, a list 108 of search schemes is displayed on the user interface 106 from which the subscriber selects one of the search schemes. The list 108 is similar to the traditional menu associated with the pre-IR mobile stations. The list 108 includes the search schemes known as a home only search scheme 120, a preferred-alternate search scheme 122, an alternate-preferred search scheme 124, a preferred only search scheme 126 and an alternate only search scheme 128.

The IR mobile station 100 includes a processor 110 having a software flag or compile option that is triggered when the subscriber wants to emulate the pre-IR scanning routine. The software flag within the processor 110 may be a factory option string which when activated makes the IR mobile station 100 appear to scan for 800 MHZ service providers like the pre-intelligent roaming scanning routine. The processor 110 is coupled to the user interface 106 via line 107.

The IR mobile station 100 further includes a legacy database 112 coupled to the processor 110 via line 109. The legacy database 112 is generally associated with pre-intelligent roaming mobile stations, and includes a number assignment module 114 for storing a system identity code (SID) 116. The SID 116 is generally a unique 15-bit digital code assigned to identify the PCS telecommunications network from which the user has subscribed to for service. The SID 116 is generally programmed by a process known as Over the Air Programming.

The processor 110 interrogates the number assignment module 114 to determine whether the SID 116 is odd or even. If the SID 116 is odd, then a home service band used by a home service provider of the IR mobile station 100 is the "a" service band. Otherwise, the home service band used by the home service provider of the IR mobile station 100 is the "b" service band when the SID 116 is even.

Upon determining the particular home service band of the IR mobile station 100, a temporary preferred system variable is set to equal the "a" service band and a temporary alternate system variable is set to equal the "b" service band when the home service provider uses the "a" service band. In contrast, the temporary preferred system variable is set to equal the "b" service band and the alternate system variable is set to equal the "a" service band when the home service provider uses the "b" service band. The temporary preferred system variable and the temporary alternate system variable are memory locations associated with the processor 110.

After the subscriber selects the search scheme from the list 108, the processor 110 begins to modify the IRDB 102 via line 111 to emulate the legacy database 112 by setting a control word bit 0 132 to a signal level "0" and by setting all entries in a band order 134 to "none". The home service provider can set the control word bit 132 and the band order 134 during provisioning or by a process known as Over the Air Programming.

The processor 110 further modifies the IRDB 102 so that the IR scanning routine 104 is restricted to scan only the service bands in the 800 MHZ spectrum. More particularly, the six service bands (e.g., "A", "B", "C", "D", "E" and "F" service bands) associated with the 1900 MHZ spectrum are blocked out and only the "a" and "b" service bands of the 800 MHZ spectrum will be scanned. The IR scanning routine 104 is located within a memory 136 associated with the processor 110.

After modifying the IRDB 102, the processor 110 operates to prioritize a band scan order to include at least one or both of the "a" and "b" service bands in the 800 MHZ spectrum based on the selected search scheme and the determined home service band. The prioritized band scan order is stored in the IRDB 102 and used by the IR scanning routine 104 to scan for a channel that connects a service provider to the IR mobile station 100 according to the selected search scheme.

The prioritized band scan order can be one of several specific types of scanning orders that are dependent upon the selected search scheme and the order of the "a" or "b" service band values stored in the temporary preferred system and alternate system variables. For example, if the selected search scheme is the preferred only search scheme 126 and the "a" service band is stored in the temporary preferred system variable, a first band of the prioritized band scan order is set to the preferred system variable or the "a" service band. The IR scanning routine 104 then scans for service providers using the "a" service band of the 800 MHZ spectrum. The "b" service band is not scanned in this example. The prioritizing of the band scan order and the setting of the band scan order for various scenarios are described in greater detail with reference to FIG. 5.

Figure 3:
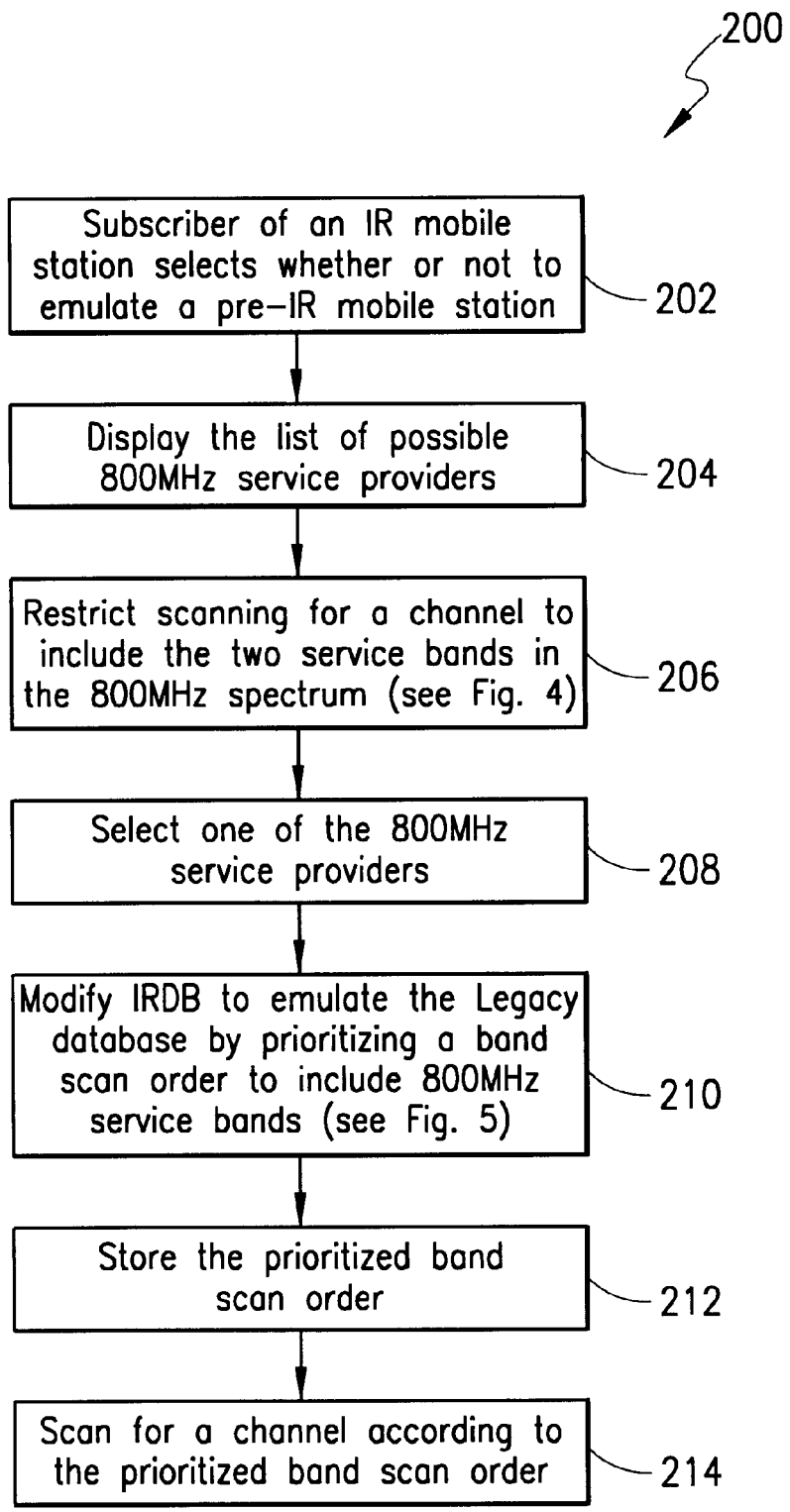
FIG. 3 is a simplified flow diagram of a procedure for emulating a pre-intelligent scanning routine of a pre-intelligent roaming mobile station using the intelligent roaming mobile station of FIG. 2.

Referring to FIG. 3, there is illustrated a simplified flow diagram of the emulation method 200. Beginning at stage 202 of the emulation method 200, the subscriber selects whether or not to emulate the pre-IR mobile station by interacting (e.g., depressing a button 130) with the user interface 106 on the IR mobile station 100; for purposes of clarity, assume that the subscriber chooses to emulate the pre-IR mobile station. As mentioned earlier, the emulation of the pre-IR mobile station is completed such that the pre-IR scanning routine 58 (FIG. 1) is no longer required even though the traditional menu associated with the pre-IR mobile stations is still displayed by the IR mobile station 100.

At stage 204, the IR mobile station 100 displays on the user interface 106 the list 108 (e.g., traditional menu) of possible search schemes of which one will be selected by the subscriber. The list 108 includes the home only search scheme 120, the preferred-alternate search scheme 122, the alternate-preferred search scheme 124, the preferred only search scheme 126 and the alternate only search scheme 128.

At stage 206, the processor 110 of the IR mobile station 100 operates to restrict the scanning for the channel to include the "a" service band and the "b" service band in the 800 MHZ spectrum (e.g., cellular hyperband). The six service bands associated with the 1900 MHZ spectrum (e.g., PCS hyperband) are not capable of servicing the subscriber due to the restriction placed on the IR scanning routine 104. The step of restricting (stage 206) will be more fully discussed with respect to FIG. 4.

At stage 208, the subscriber selects one of the search schemes 120, 122, 124, 126 and 128 from the list 108 displayed on the user interface 106. At stage 210, the IR mobile station 100 modifies the IRDB 102 to emulate the legacy database 112 by prioritizing the "a" service band and/or the "b" service band into the prioritized band scan order having a first band and/or a second band. The modification of the IRDB 102 enables the IR scanning routine 104 to be used in place of the pre-IR scanning routine. The step of prioritizing (stage 210) will be more fully discussed with respect to FIG. 5.

After completing the step of prioritizing, at stage 212 the prioritized band scan order is stored in the IRDB 102. At stage 214, the processor 110 of the IR mobile station 100 initiates the IR scanning routine 104 to scan for a channel in either the "a" or "b" service band according to the prioritized band scan order. If located, the channel connects the service provider to the IR mobile station 100 according to the selected search scheme.

Figure 4:
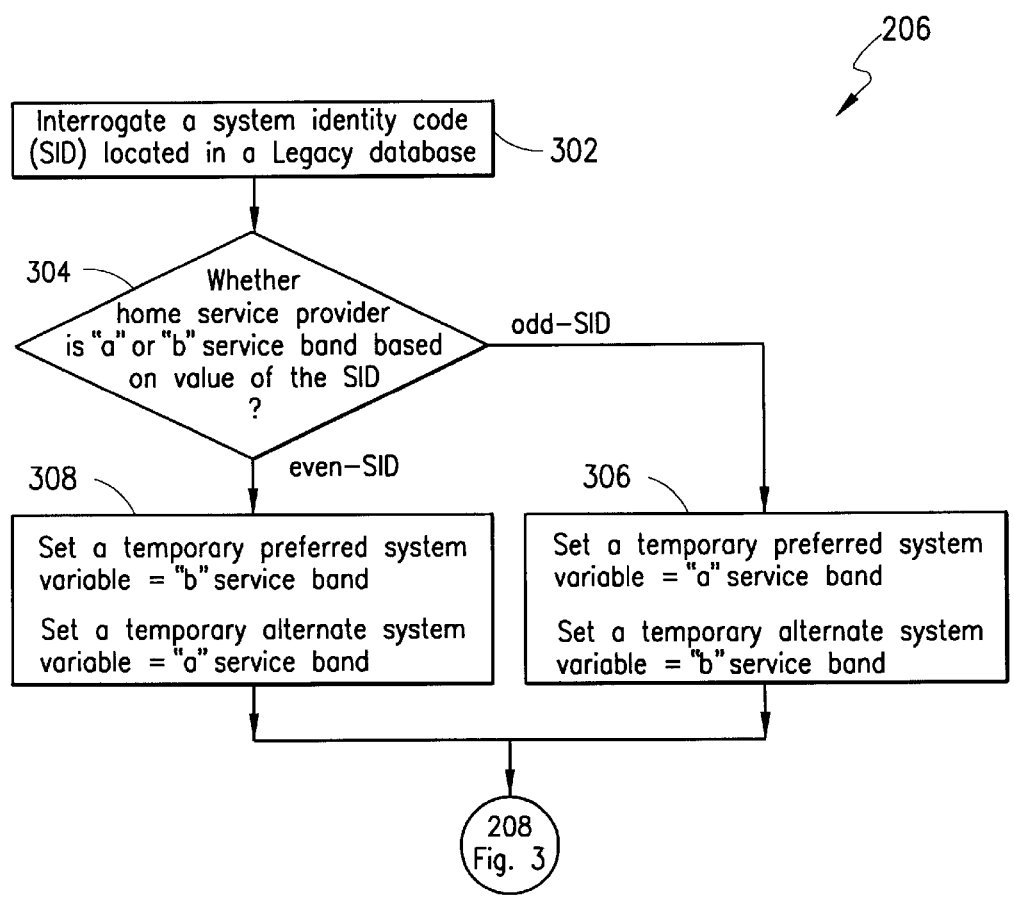
FIG. 4 is a simplified flow diagram of a step of restricting (stage 206) associated with the emulating procedure of FIG. 3.

Referring to FIG. 4, there is illustrated a simplified flow diagram of the step of restricting associated with stage 206 of FIG. 3. In performing stage 302, the IR mobile station 100 first interrogates the SID 116 in the legacy database 112.

At stage 304, the processor 110 determines whether the home service provider uses the "a" service band or the "b" service band based on a value of the SID 116. The home service provider uses the "a" service band when the SID 116 is odd, and uses the "b" service band when the SID 116 is even.

At stage 306, the IR mobile station 100 sets both the temporary preferred system variable to equal the "a" service band and the temporary alternate system variable is set to equal the "b" service band when the home band is the "a" service band. Otherwise at stage 308, the IR mobile station 100 operates to set the temporary preferred system variable equal to the "b" service band and the temporary alternate system variable is set to equal the "a" service band when the home band of the home service provider uses the "b" service band.

Figure 5:
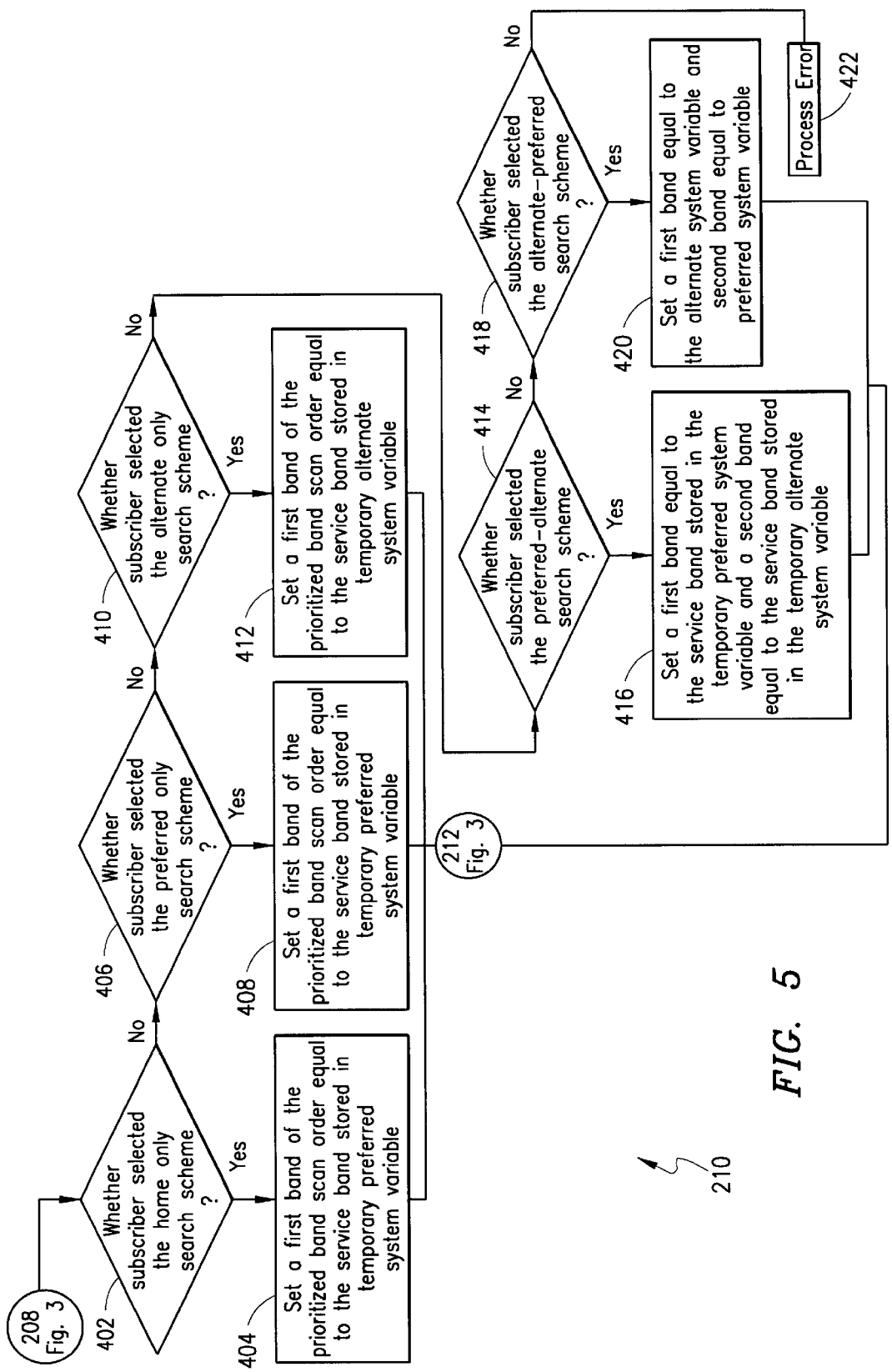
FIG. 5 is a simplified flow diagram of a step of prioritizing (stage 210) associated with the emulating procedure of FIG. 3.

Referring to FIG. 5, there is illustrated a simplified flow diagram of the step of prioritizing associated with stage 210 of FIG. 3. Generally, one of five prioritizing procedures will take place depending upon the selected search scheme and the particular service band of the home service provider.

At stages 402 and 404, if the subscriber selected the home only search scheme 120 at stage 402 and the home service provider is determined to use the "a" service band then the step of prioritizing at stage 404 includes setting a first band of the prioritized band scan order to the set temporary preferred system variable or the "a" service band. It should be noted that if the home service provider is determined to use the "b" service band then the set temporary preferred system variable is equal to the "b" service band and the first band would be the "b" service band. In addition, the IR mobile terminal 100 sets the control word bit 0 132 to a high "1" signal level.

At stage 406 and 408, if the subscriber selected the preferred only search scheme 126 at stage 406 and the home service provider is determined to use the "a" service band, then the step of prioritizing at stage 408 includes setting the first band of the prioritized band scan order to the set temporary preferred system variable or the "a" service band. If the home service provider is determined to use the "b" service band, then the set temporary preferred system variable is equal to the "b" service band and the first band would be the "b" service band.

At stages 410 and 412, if the subscriber selected the alternate only search scheme 128 at stage 410 and the home service provider is determined to use the "a" service band, the step of prioritizing at stage 412 includes setting the first band of the prioritized band scan order to the set temporary alternate system variable or the "b" service band. In contrast, if the home service provider is determined to use the "b" service band then the set alternatesytem variable is equal to the "a" service band and the first band would be the "a" service band.

At stages 414 and 416, if the subscriber selected the preferred-alternate search scheme 122 at stage 414 and the home service provider is determined to use the "a" service band then the step of prioritizing at stage 416 includes setting the first band of the prioritized band scan order to the set temporary preferred system variable or the "a" service band, and setting a second band of the prioritized band scan order to the set temporary alternate system variable or the "b" service band. Otherwise, if the home service provider is determined to use the "b" service band then the first band would be the "b" service band and the second band would be the "a" service band.

At stages 418 and 420, if the subscriber selected the alternate-preferred search scheme 124 at stage 418 and the home service provider is determined to use the "a" service band then the step of prioritizing at stage 420 includes setting the first band of the prioritized band scan order to the set alternate system variable or the "b" service band, and setting the second band of the prioritized band scan order to the set preferred system variable or the "a" service band. Otherwise, if the home service provider is determined to use the "b" service band then the first band would be the "a" service band and the second band would be the "b" service band.

In the event none of the search schemes are selected then a process error is generated at stage 422.

From the foregoing, it can be readily appreciated by those skilled in the art that the present invention provides a method and intelligent roaming mobile station that emulates a pre-intelligent roaming mobile station's scanning routine while continuing to display a menu associated with the pre-intelligent roaming mobile station. Also, the intelligent roaming mobile station as disclosed does not require maintenance and support of two separate scanning routines.

Although one embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions.

What is claimed is:

1. A method using an intelligent roaming mobile station for emulating a pre-intelligent scanning routine used by a pre-intelligent roaming mobile station, said intelligent roaming mobile station locating a service provider operating within an 800 MHz spectrum associated with the pre-intelligent scanning routine, and capable of locating a service provider operating within the 800 MHz spectrum and a 1900 MHz spectrum associated with an intelligent scanning routine, said method comprising:

restricting the intelligent roaming mobile station to scan a plurality of service bands in the 800 MHz spectrum associated with the pre-intelligent roaming mobile station;

selecting a search scheme from a plurality of search schemes used by the pre-intelligent roaming mobile station;

prioritizing, in response to the selected search scheme, at least one service band of the plurality of service bands in the 800 MHz spectrum into a band scan order; and scanning for a channel in said at least one service band according to the prioritized band scan order, wherein said channel connects a service provider to the intelligent roaming mobile station according to the selected search scheme.

2. The method of claim 1, further comprising the step of selecting whether or not the intelligent roaming mobile station will emulate the pre-intelligent roaming mobile station.

3. The method of claim 1, further comprising the step of displaying a list on a user interface of the intelligent roaming mobile station, said list includes the plurality of search schemes.

4. The method of claim 1, further comprising the step of storing the prioritized band scan order in an intelligent roaming database.

5. The method of claim 1, wherein said step of restricting further includes determining whether a home service provider utilizes a first service band or a second service band of the plurality of service bands.

6. The method of claim 5, wherein said step of determining whether a home service provider utilizes a first service band or a second service band further includes the steps of:

interrogating a system identity code to determine whether the system identity code is odd or even;

if the system identity code is odd, associating the home service provider with the first service band; and if the system identity code is even, associating the home service provider with the second service band.

7. The method of claim 6, further comprising the steps of:

setting a first variable equal to the first service band and a second variable equal to the second service band if the home service provider uses the first service band; and setting the first variable equal to the second service band and the second variable equal to the first service band if the home service provider uses the second service band.

8. The method of claim 7, wherein said step of selecting a search scheme further includes the steps of:

displaying a list of the plurality of search schemes including a home only search scheme, a preferred-alternate search scheme, an alternate-preferred search scheme, a preferred only search scheme and an alternate only search scheme; and choosing the selected search scheme from the list.

9. The method of claim 8, wherein the step of prioritizing further includes setting a first band of the prioritized band scan order to the set first variable when the selected search scheme is the home only search scheme.

10. The method of claim 8, wherein the step of prioritizing further includes setting a first band of the prioritized band scan order to the set first variable when the selected search scheme is the preferred only search scheme.

11. The method of claim 8, wherein the step of prioritizing further includes setting a first band of the prioritized band scan order to the set second variable when the selected search scheme is the alternate only search scheme.

12. The method of claim 8, wherein the step of prioritizing includes setting a first band of the prioritized band scan order to the set first variable and a second band of the prioritized band scan order to the set second variable when the selected search scheme is the preferred-alternate search scheme.

13. The method of claim 8, wherein the step of prioritizing includes setting a first band of the prioritized band scan order to the set second variable and a second band of the prioritized band scan order to the set first variable when the selected search scheme is the alternate-preferred search scheme.

14. A method for configuring an intelligent roaming mobile station including an intelligent roaming database to emulate a pre-intelligent scanning routine associated with a pre-intelligent roaming mobile station, said intelligent roaming mobile station locating a service provider operating within an 800 MHz spectrum associated with the pre-intelligent scanning routine, and capable of locating a service provider operating within the 800MHz spectrum and a 1900 MHz spectrum associated with an intelligent scanning routine said method comprising the steps of:

restricting the intelligent roaming mobile station to scan an "a" service band and a "b" service band operating within a 800 MHZ spectrum;

selecting a search scheme from a plurality of search schemes used by the pre-intelligent roaming mobile station including a home only search scheme, a preferred-alternate search scheme, an alternate-preferred search scheme, a preferred only search scheme and an alternate only search scheme;

prioritizing, in response to the selected search scheme, at least one of the "a" service band and the "b" service band within the 800 MHz spectrum into a band scan order; and storing the prioritized band scan order within the intelligent roaming database.

15. The method of claim 14, further comprising the step of selecting whether or not the intelligent roaming mobile station will emulate the pre-intelligent roaming mobile station.

16. The method of claim 14, further comprising the step of displaying a list on a user interface of the intelligent roaming mobile station, said list includes the plurality of search schemes.

17. The method of claim 14, further comprising the step of scanning for a channel in a predetermined order according to the prioritized band scan order, where said channel connects a service provider to the intelligent roaming mobile station according to the selected search scheme.

18. The method of claim 17, wherein said step of restricting includes determining whether a home service provider utilizes the "a" service band or the "b" service band by the following steps:

interrogating a system identity code in the legacy database to determine whether the system identity code is odd or even;

if the system identity code is odd, associating the home service provider with the "a" service band; and if the system identity code is even, associating the home service provider with the "b" service band.

19. The method of claim 18, further comprising the following steps:

setting a first variable equal to the "a" service band and a second variable equal to the "b" service band if the home service provider uses the "a" service band; and setting the first variable equal to the "b" service band and the second variable equal to the "a" service band if the home service provider uses the "b" service band.

20. The method of claim 19, wherein the step of prioritizing further includes setting a first band of the prioritized band scan order to the set first variable when the selected search scheme is the home only search scheme.

21. The method of claim 19, wherein the step of prioritizing further includes setting a first band of the prioritized band scan order to the set first variable when the selected search scheme is the preferred only search scheme.

22. The method of claim 19, wherein the step of prioritizing further includes setting a first band of the prioritized band scan order to the set second variable when the selected search scheme is the alternate only search scheme.

23. The method of claim 19, wherein the step of prioritizing further includes setting a first band of the prioritized band scan order to the set first variable and a second band of the prioritized band scan order to the set second variable when the selected search scheme is the preferred-alternate search scheme.

24. The method of claim 19, wherein the step of prioritizing further includes setting a first band of the prioritized band scan order to the set second variable and a second band of the prioritized band scan order to the set first variable when the selected search scheme is the alternate-preferred search scheme.

25. An intelligent roaming mobile station for emulating a pre-intelligent scanning routine used by a pre-intelligent roaming mobile station, said intelligent roaming mobile station with means for locating a service provider operating within an 800 MHz spectrum associated with the pre-intelligent scanning routine, and means for locating a service provider operating within the 800 MHz spectrum and a 1900 MHz spectrum associated with an intelligent scanning routine, said intelligent roaming mobile station comprising:

a processor including means for restricting the scanning of a plurality of service bands within the 800 MHz spectrum and the 1900 MHz spectrum to the service bands operating only within the 800 MHZ spectrum;

a user interface coupled to said processor for displaying a list of a plurality of search schemes and for enabling a selection of a search scheme from the plurality of search schemes;

said processor for prioritizing, in response to the selected search scheme, at least one service band of the service bands operating within the 800 MHZ spectrum;

an intelligent roaming database coupled to the processor for storing the plurality of service bands; and an intelligent roaming scanning routine associated with the processor for scanning the at least one prioritized service band of said service bands operating within the 800 MHZ spectrum for a channel according to a prioritized band scan order, wherein said channel connects a service provider to the intelligent roaming mobile station according to the selected search scheme.

26. The intelligent roaming mobile station of claim 25, further comprising a legacy database having a number assignment module for storing a system identity code.

27. The intelligent roaming mobile station of claim 25, wherein the service bands operating within the 800 MHZ spectrum include an "a" service band and a "b" service band.

28. The intelligent roaming mobile station of claim 25, wherein the plurality of search schemes include a home only search scheme, a preferred-alternate search scheme, an alternate-preferred search scheme, a preferred only search scheme and an alternate only search scheme.

29. The intelligent roaming mobile station of claim 25, wherein the user interface includes means for activating the emulation of the pre-intelligent scanning routine.

* * * * *